United States Patent [19]

Erlenmaier et al.

[11] Patent Number: 4,813,750
[45] Date of Patent: Mar. 21, 1989

[54] TRACK CHAIN CONSTRUCTED PURSUANT TO THE LINKAGE PRINCIPLE FOR TRACK-LAYING VEHICLES

[75] Inventors: Gunter Erlenmaier, Vellmar; Klaus Spies, Remscheid, both of Fed. Rep. of Germany

[73] Assignee: Diehl GmbH & Co., Nuremberg, Fed. Rep. of Germany

[21] Appl. No.: 64,220

[22] Filed: Jun. 18, 1987

[30] Foreign Application Priority Data

Jul. 28, 1986 [DE] Fed. Rep. of Germany ....... 3625491

[51] Int. Cl.$^4$ .............................................. B62D 55/20
[52] U.S. Cl. ............................... 305/58 PC; 305/58 R
[58] Field of Search ................... 305/58 PC, 58 R, 39, 305/42, 57, 11, 13

[56] References Cited

U.S. PATENT DOCUMENTS

| 3,340,717 | 9/1967 | Korner et al. | 305/38 PC |
| 4,093,319 | 6/1978 | Borner | 305/58 R |

FOREIGN PATENT DOCUMENTS 1605523 4/1970 Fed. Rep. of Germany .
1363977 5/1964 France .
1186991 10/1985 U.S.S.R. .......................... 305/58 PC

OTHER PUBLICATIONS

European Search Report.

*Primary Examiner*—James B. Marbert
*Attorney, Agent, or Firm*—Scully, Scott, Murphy & Presser

[57] ABSTRACT

A track or caterpillar chain for track-laying vehicles, in which the track chain is constructed pursuant to the linkage principle, incorporating connecting pins supported in rubber bushings in the chain links, and separate connectors arranged outside on the connector pins which are clampable by a screw for the connection of the chain links. The track chain link, which to some extent is constructed as a tubular member has at least two openings provided therein for the receipt of toothed driving sprocket wheels or pinions, in which the openings are defined or bounded by two tube portions of the tubes extending somewhat transversely of the direction of travel of the track chain, and bounded by lateral or side strap-like connectors.

7 Claims, 2 Drawing Sheets

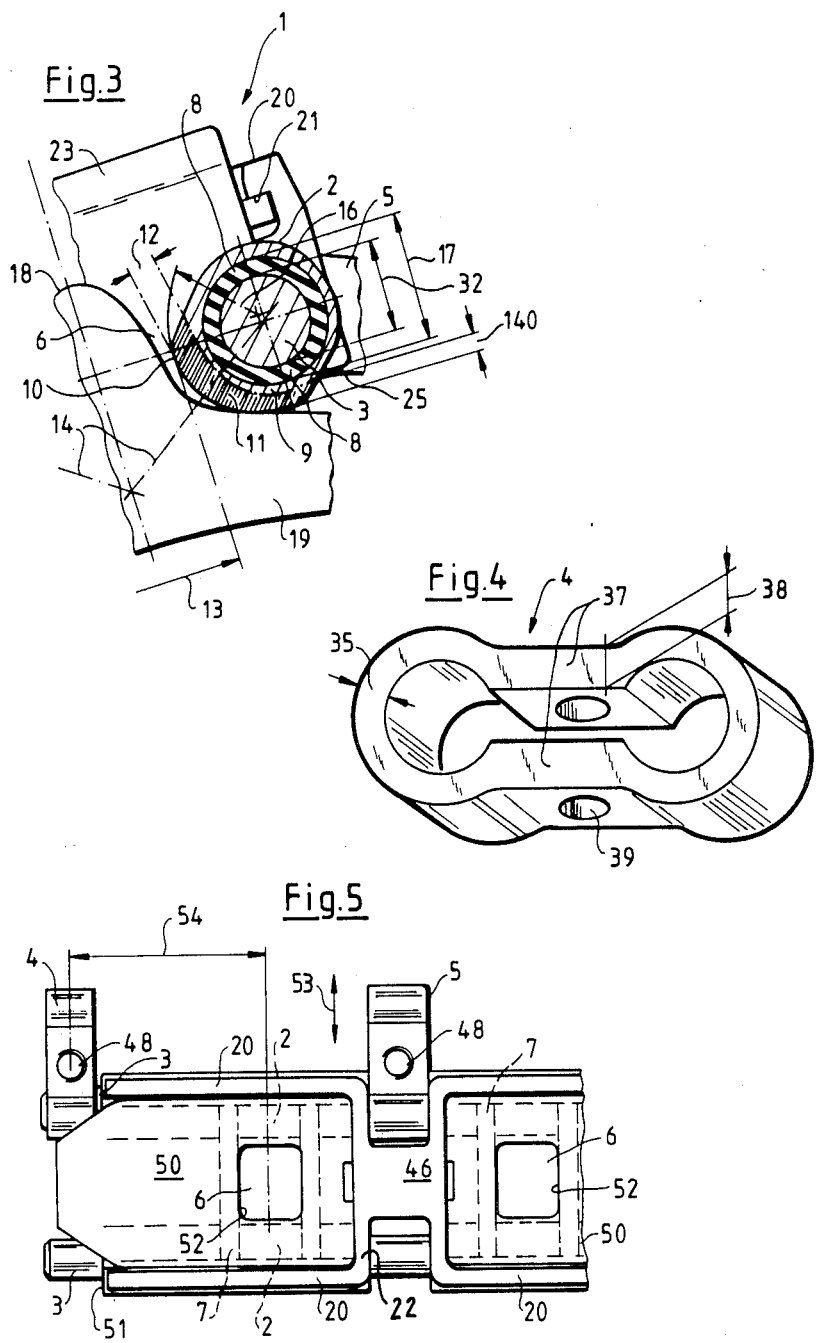

TRACK CHAIN CONSTRUCTED PURSUANT TO THE LINKAGE PRINCIPLE FOR TRACK-LAYING VEHICLES

BACKGROUND OF THE INVENTION

1. Field of the Invention

The present invention relates to a track or caterpillar chain for track-laying vehicles, in which the track chain is constructed pursuant to the linkage principle, incorporating connecting pins supported in rubber bushings in the chain links, and separate connectors arranged outside on the connector pins which are clampable by a screw for the connection of the chain links.

2. Discussion of the Prior Art

For the track chains of track-laying vehicles, in which connectors are located externally of the tubular member of the chain link, attempts have been made to obtain a savings in weight in that, commencing with a certain bending stress on the connector pins, the interconnected track chain components; in essence, the track chain links and the connectors, will mutually support themselves laterally, and as a result, protect the connector pins from further bending, as described in the disclosure of German Patent No. 26 14 691. This renders it possible to design the diameters of the connector pins to be smaller, and also to provide for a lighter track chain link. However, it has been shown in actual practice that maintaining the pregiven spacing tolerances is not possible, and that there is encountered a premature breaking or failure of the connector pins.

SUMMARY OF THE INVENTION

Accordingly, it is an object of the present invention to reduce the weight of the track chain while maintaining the operational dependability of known track or caterpillar chains for track-laying vehicles, which chains are constructed pursuant to the linkage principle.

The foregoing object is achieved through the intermediary of the present invention, in that the track chain link, which to some extent is constructed as a tubular member has at least two openings provided therein for the receipt of toothed driving sprocket wheels or pinions, in which the openings are defined or bounded by two tube portions of the tubes extending somewhat transversely of the direction of travel of the track chain, and bounded by lateral or side strap-like connectors.

The engagement by the tooth or sprocket of the driving pinion or sprocket wheel is not carried out, in contrast with present practice, by bearing against the externally positioned connectors for the track chain, but within the chain link intermediate the tubes and laterally or sideways between two connectors for the lateral guidance of the driving pinion.

The wear surfaces of the tubular member, which come into contact with the driving pinion or sprocket wheel are provided with a hardened surface layer in order to obtain a high resistance to wear. The depth of the hardened surface extends from the tooth flank surfaces of the driving gear tooth or sprocket up to about the bore for the connector pins. As a consequence, the tube member is employable for so long until the entire hardened surface layer has worn off, and there only still remains a thin unhardened zone of the remaining wall thickness, without the danger of the tubular member rupturing and thereby becoming unusable. The tube wall region which has been treated in accordance with this wear volume principle, has to transmit only small measures of tensile forces to the track chain, and is thereby worn only to a small minimal extent. However, in a known outwardly located connector, constructed pursuant to the disclosure of German Patent No. 17 55 630, which, as presently common, wears because of the engagement of a tooth or sprocket, a relatively large residual wall thickness must remain intact, since the connector must ultimately transmit the entire tensile loads of the track chain. Through the inventive preparation of this large wear volume, the usable life expectancy of the tube member is hereby approximately 1½ to 2 times that of a usual connector or link with a corresponding hardened zone.

The connector pin diameter is substantially smaller in comparison with presently known constructions. This provides the secondary effect that the chain link is correspondingly lower in height, and thereby lighter at the same thickness of the rubber bearing for the connector pins.

At a pregiven width for the track chain, measured between the outer surfaces of the connectors, pursuant to the invention the elastic bearing or supported length of the connector pins within the tube member is substantially greater, and namely by about between 3 and 5%, inasmuch as the outwardly located connectors, in comparison with present constructions, are designed substantially smaller. Pursuant to the invention, there is available a 5 to 7% greater bearing or supported length for the connector or link pins.

Inasmuch as the driving sprocket wheel or pinion does not contact against the outwardly located chain connectors, the latter are advantageously constructed in a clamping collar-like structure with thin wall thicknesses. The wall thicknesses in the encompassing region of the connectors are so designed, that the loads or forces which are to be transmitted during the operation of the track chain are dependably transmitted.

The engagement of the gear tooth into the tubular member extensively frees the connector pin from shock-like or intermittently encountered bending forces, and thereby protects the highly-sensitive bearings of the connector pins. As a result of the thin wall thicknesses, the connector provides the function of a clamp band or collar which encompasses the connector pins with a uniform tangential force without any appreciable bending. For the fastening thereof, a small clamping force is sufficient, and thereby for the provision of a smaller and lighter screw. Consequently, the assembling forces are lower and, as a result, the connector can be mounted more rapidly and easier in contrast with the present state-of-the-technology.

At pregiven place conditions on the vehicle with relatively closely neighboring driving pinions or sprocket wheels, the openings for the gear teeth are located in proximity to the middle part of the tubular member. In correspondence therewith, so as to provide for the removal of dirt, cutouts extend through the track treads. A so-called "climbing up" of the caterpillar or track chain on the driving pinions, which is related with the throwing off of the chain from track-laying vehicle, is thereby prevented with a high degree of assurance.

It is important to the invention that the tubular member has both of openings for the engagement of the driving pinions or sprocket wheel located between the tube sections. This constructive measure provides for a saving in weight in the magnitude of 8 to 10% of the tube member, notwithstanding the approximately 3 to 5% greater width of the tube member. The wider tube member significantly increases the bottom-contacting surface of the chain with the ground, so that the specific ground pressure or compression becomes correspondingly lower. Consequently, there increases the mobility of a vehicle over the terrain for the same vehicle driving power output; with the same being applicable to travel over a roadway. This constructive measure has the further result that, through the introduction of force directly into the tube members, the pins are more expediently stressed or loaded, and the connectors are completely unstressed from the engagement by the driving gear teeth or sprockets. The combined measures, in contrast with a standard chain for heavy armored vehicles, lead to a weight savings of approximately 14% which translates to a weight savings for a vehicle of approximately 750 kg.

BRIEF DESCRIPTION OF THE DRAWINGS

Reference may now be had to the following detailed description of exemplary embodiments of the invention, taken in conjunction with the accompanying drawings; in which:

FIG. 3 illustrates the engagement of a driving pinion or sprocket wheel with the tubular member of FIG. 1, taken along section line III—III, with the inserted running tread;

FIG. 4 illustrates a chain link connector pursuant to FIG. 1; and

FIG. 5 illustrates a further embodiment of a tubular member.

DETAILED DESCRIPTION

Figure 1:
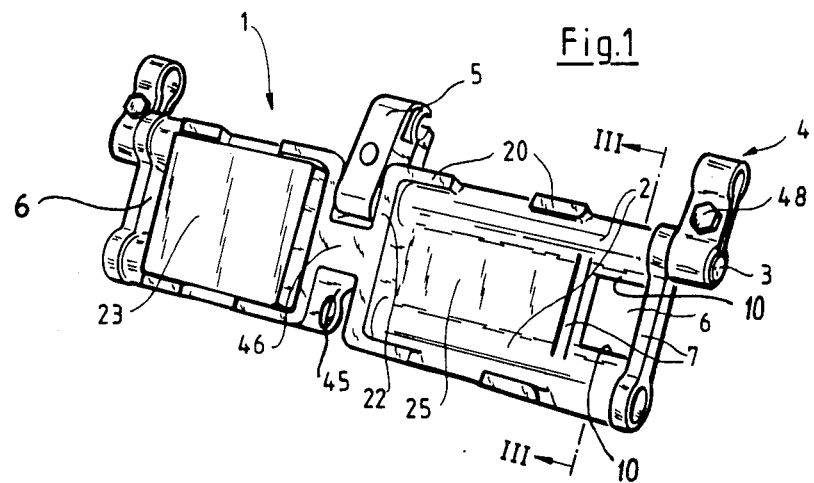
FIG. 1 illustrates a generally perspective view of a tubular member or track chain link viewed from the side of the roadway.
Figure 2:
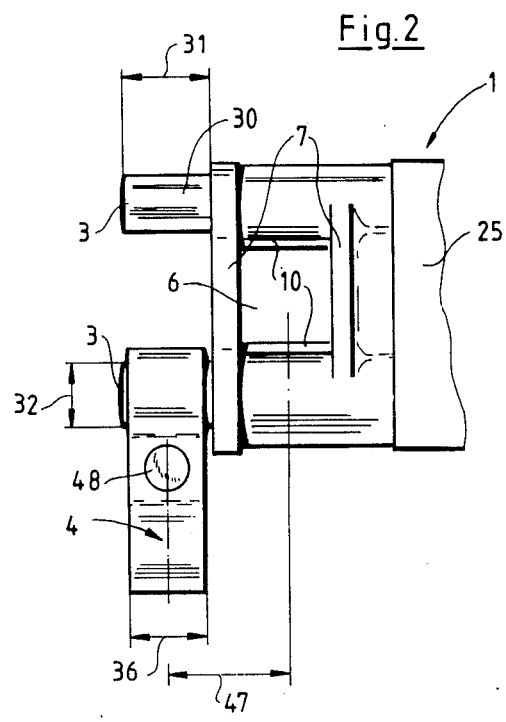
FIG. 2 illustrates the tubular member of FIG. 1 viewed from the side of the driving wheels.

A tubular member 1 or link of a track chain (not shown) for a track-laying vehicle, which is constructed in accordance with the linkage principle, is provided with through-extending pins 3 which are supported in tubes 2, and with connectors 4 fastened to the outer ends of the pins and with a central connector 5. The rubber bearings or bushings are designated by reference numeral 8.

Openings 6 for the tooth or sprocket 18 of a driving pinion or sprocket wheel 19 are defined by the tubes 2 and through strap connectors 7. On the tubes 2 there are provided integral, hardened cam wear surfaces 10 with reniform or kidney-shaped surface layer hardening zones 11. The wider sections 12 contact against the narrowest cross-section 13 of the opening 6. The main axes 14 of the hardening zones 11 form a V-shape. The middle radius 16 for the outer contour of the hardening zone 11 corresponds somewhat with the inner diameter 17 of the tubes 2. A tooth or sprocket 18 of a driving gear 19 engages in the gear tooth-engaging opening 6, as illustrated in FIG. 3.

The track chain links or tubular members 1 incorporate gripper bars 20 with guide grooves 21 and contact bars 22 for an insertable running tread 23 provided thereon, as well as a H-shaped middle part 46 and base plates 25. The middle part 46 incorporates cutouts for the insertion of the middle connector 5.

The exposed pin section 30 have a length 31 which corresponds to approximately 1.4 times the diameter 32 of the pin 3.

The wall thickness 35 of the chain link connector 4 is dimensioned to be approximately 25% the diameter of the pin 32. The bearing length 36 corresponds to approximately 1.3 times the pin diameter 32. The equally-heavy support plates 37, because the necessary force or load-transmissive connection between the pin 3 and the connector 4, possess a wall thickness 38 which is about 30% heavier than the wall thickness 35. The load-transmissive connection is produced through the screw connection 48 in a bore 39.

A distance 47 between the middle of the opening 6 and the middle of the connector 4 is extremely small. Located therebetween is only one strap connector 7. This small distance 47 leads to a relative low stressing of the pin 3 during the travel of a track-laying vehicle.

The mounting of a caterpillar or track possessing the above-described components is carried out, in that tubular members 1 which are equipped with treads 23 and rubber bushing-supported pins 3 are connected with each other by means of the connectors so as to provide an endless structure through the link connectors 4 and 5. Hereby, the link connectors 4 and 5 clamp the pins 3 so as be secured against rotation. The necessary clamping forces on the connectors 4 and 5 are produced through known screw connections 48.

Pursuant to FIG. 5, a tubular member or tread 51 which is equipped with treads 50, incorporates openings 6 in the tubular member 51, and in effect, within the traveling treads 50. For this purpose, the treads or running cushions 50 are provided with through-extending cutouts 52 for the discharge of dirt.

Strap connectors or webs 7 bound the openings 6 laterally, whereas the tubes 2 bound the openings in the direction of travel 53. A relatively large distance 54 is formed between the openings 6 and the link connector 4.

What is claimed is:

1. In a caterpillar or track chain for track-laying vehicles; including rubber-supported pins; chain links having said pins supported therein; separate link connectors externally arranged of the pins; and screw means clamping said link connectors for the connection of the chain links; the improvement comprising in that said chain links incorporate tubular members each having at least two openings for engagement by driving sprocket wheels, said openings being each bounded by two tube sections of each said tubular member which extend substantially transversely of the direction of travel of the track chain and by lateral strap connectors, the side surfaces of the tube sections which are engaged by sprockets of the sprocket wheels extending into the openings in said tubular member include hardened cam wear surfaces, the main axes of the cam wear surfaces forming a V-shape, and said cam wear surfaces constituting substantially reniform surface layer hardening zones formed on the tube sections of the tubular member, said surfaces have the widest sections thereof contacting at the narrowest cross-section at the location of the engagement of the sprocket in the opening of the tubular member, while their smallest sections extend at somewhat right-angles thereto, and in which the surface layer hardening one is seated on an encompassing unhardened zone of the tubular member.

2. A track chain as claimed in claim 1, wherein the cam wear surfaces possess a mean radius which generally conforms with the inner diameter of the tubular member.

3. A track chain as claimed in claim 1, wherein the length of the pin sections laterally projecting from the tubular member is approximately 1.4 times the diameter thereof.

4. A track chain as claimed in claim 3, wherein the link connectors which are fastened on the projecting pin section possess an extremely thin wall thickness in the encompassing region, in a ratio of about 1:4 to the diameter of the pin, and are formed as a clamping band, and wherein the bearing length of the link connector on the pin corresponds to approximately 1.3 times the diameter thereof; and support plates on said chain links are approximately 30% thicker than the wall thickness and are of generally uniform thickness.

5. A track chain as claimed in claim 1, wherein the tubular member includes gripper bars facing towards the roadway and base plates facing towards the driving sprocket wheels.

6. A track chain as claimed in claim 1, wherein the tubular member includes gripper bars and contact bars with guide grooves between openings for insertable track treads.

7. A track chain as claimed in claim 1, wherein the tubular member is integrally constructed with an H-formed middle part reinforced by contact bars and gripper bars, and said middle part includes two cutouts between the stop bars in the region of the pins for a central link connector.

* * * * *